United States Patent [19]

Walworth et al.

[11] Patent Number: 5,067,751
[45] Date of Patent: Nov. 26, 1991

[54] GASKET FOR FIELD ADAPTABLE PUSH-ON RESTRAINED JOINT AND JOINT THUS PRODUCED

[75] Inventors: Van T. Walworth, Warrior; Steve L. DeBoalt, Birmingham, both of Ala.

[73] Assignee: American Cast Iron Pipe Company, Birmingham, Ala.

[21] Appl. No.: 558,441

[22] Filed: Jul. 27, 1990

[51] Int. Cl.$^5$ ............................................. F16L 17/02
[52] U.S. Cl. .................................. 285/105; 285/232; 285/374; 285/910
[58] Field of Search ............... 285/104, 105, 230, 231, 285/232, 374, 910, 337, 340

[56] References Cited

U.S. PATENT DOCUMENTS

| | | | |
|---|---|---|---|
| 2,201,372 | 5/1940 | Miller | 285/105 |
| 2,758,852 | 8/1956 | Newell | 285/232 X |
| 2,953,398 | 9/1960 | Haugen et al. | |
| 3,390,890 | 7/1968 | Kurtz | |
| 3,963,298 | 6/1976 | Seiler | 285/105 |
| 4,229,026 | 10/1980 | Seiler | 285/105 |
| 4,303,262 | 12/1981 | Pierrel et al. | 285/232 |
| 4,867,488 | 9/1989 | Jones | 285/337 X |

OTHER PUBLICATIONS

U.S. Pipe product brochure, FIELD-LOK Gasket System, 1984 edition.

Primary Examiner—Dave W. Arola
Assistant Examiner—Heather Chun
Attorney, Agent, or Firm—Kerkam, Stowell, Kondracki & Clarke

[57] ABSTRACT

A self-actuating restraining gasket having optional integral sealing means is provided which is used particularly in bell-and-spigot pipe joints or joints employing pipe appurtenances, and more particularly in joints to be assembled in the field, the bell end of the pipe or pipe appurtenance to be employed having an annular recess adapted to receive the gasket therein, the gasket further employing a plurality of pairs of cooperating metal retaining elements embedded in the elastomeric gasket, the pairs of retaining elements being spaced apart around the circumference of the gasket, each pair of retaining elements comprising a wedging member and a backing member for the wedging member, and wherein the pairs of retaining elements act as the self-actuating retention or restraining elements, and an optional compressible back part of the gasket acts as a fluid seal when a pipe spigot is inserted in the bell.

39 Claims, 5 Drawing Sheets

GASKET FOR FIELD ADAPTABLE PUSH-ON RESTRAINED JOINT AND JOINT THUS PRODUCED

BACKGROUND OF THE INVENTION

1. Field of the Invention.

The present invention relates to a gasket for a field adaptable push-on joint and the joint produced by two sections of pipe or piping appurtenances such as valves, fittings, hydrants and the like, and the gasket.

2. Description of Related Art.

Sealing and restraining gaskets are generally known in the art for use in pipe joints. For example, U.S. Pat. No. 3,963,298 by Seiler discloses a gasket having a plurality of "unibody" metal inserts disposed around the circumference of an elastomeric gasket. In one embodiment in that patent, the radial outer surface of each insert is provided with a curved surface which mates with a corresponding curved surface provided on an annular bead extending radially inwardly from the interior wall of the socket or bell. The shapes of the mating surfaces of these elements creates a pivot axis about which the metal inserts will be permitted to pivot or rotate relative to the pipe sections. In this embodiment, the annular bead in the socket must therefore be of a specific shape corresponding to a specific shape of the radial outer surface of the metal inserts disposed in the gasket. An undesirable feature of such an embodiment is that a special, more complicated bell structure is required in order to provide the mating surface for the metal inserts and thus has a relatively high cost of manufacture and the application of the restraining gasket is limited to use with the specific associated bell configuration.

A second embodiment is disclosed in the above-identified Seiler patent. In this embodiment, the specially shaped annular bead is not employed in the bell. Instead a specifically sized semicircular groove is provided adjacent to the end shoulder of the bell section. The plurality of metal inserts employed in this embodiment are provided with curved, convex radial outer surfaces which have a curvature and size corresponding to the curvature and size of the semicircular groove. While the bell structure may be considered to be somewhat less complicated in this embodiment, the ability of the metal inserts to securely grip and retain the inserted spigot end of the pipe continues to depend on the corresponding curvatures of the inserts and the semicircular groove in the bell, and the ability of the metal inserts to pivot within the groove. Thus, this embodiment also leaves much to be desired in terms of the cost of manufacture and the ability to use the gasket with other internal bell configurations.

U.S. Pat. No. 4,229,026, also issued to Seiler, discloses a further embodiment of a "unibody" metal insert adapted to be used as a gripping member in a rubber gasket. In this patent, the metal insert retaining elements are, on one hand, described as being fixedly embedded in the elastomer seal ring, while at the same time are described as being slidable as well as axially tiltable with respect to the elastomer parts of the ring. This movement of the retaining elements is possible only if the elastomeric material immediately adjacent the retaining elements also deforms to some extent to accommodate such movement.

In each of the embodiments disclosed in the '026 patent, the metallic retaining elements are tiltably supported on an annular bead extending radially inwardly from the inner wall of the bell. Several different shapes are proposed for the annular bead and the radial outer surface of the retaining elements. While the embodiments in this patent do not require the annular bead and retaining element to have identical curvatures for establishing a fixed pivot axis, there is an interdependence between the profiles of the annular bead and retaining elements. The retaining elements must remain in contact with the spigot end of the pipe, while at the same time being allowed to slide and tilt axially with respect to the elastomeric gasket. The specification notes that increasing retaining forces are generated by way of the retaining elements being driven in a wedge-like manner in the gap between the contact surface of the socket (annular bead) and the circumferential surface of the spigot end of the pipe. Thus, there is still a requirement to provide an internal bell configuration having a specially designed annular bead or profile which can increase the cost of manufacture and will affect the ability to use the gasket with other bell configurations.

In other pipe joints known in the art, separate means are employed to provide the sealing and retention functions. Assembling pipe joints of the bell-and-spigot type using separate sealing and retention means tends to be time consuming and costly. These type of joints further have generally not heretofore been self-actuating, thereby causing additional work be performed in the field in order to actuate the retention or restraining means.

It is therefore a principal object of the present invention to provide a gasket suitable for use in a push-on restrained joint which is less dependent on the particular internal bell configuration for effective operation in a field-adaptable bell-and-spigot joint.

It is another important object of the present invention to provide a gasket and a bell-and-spigot joint employing the gasket in which improved restraining forces are provided by restraining means disposed in the gasket.

It is another important object of the present invention to provide a gasket and a bell-and-spigot joint employing said gasket therein restraining means and disposed in the gasket which provide a substantially constant restraining force at any given pressure thrust level, regardless of the fit of the joint.

It is another object of the invention to provide pipe-restraining means embedded in the gasket which permit the elastomeric gasket to be made in either a single durometer or a dual durometer configuration.

SUMMARY OF THE INVENTION

These and other objects of the present invention are realized in the gasket of the present invention, which provides improved gripping or restraining action, while at the same time allows a simpler internal wall configuration of the bell, which reduces the cost of pipe manufacture. This is accomplished by providing a plurality of paired cooperating metal retaining elements embedded in the gasket which are spaced apart around the circumference of the gasket. As used herein in connection with the description of the present invention, the term "gasket" is used to refer to a basic element adapted to provide a restraining function only, however, the gasket may optionally provide both a restraining function and a sealing function in certain specific embodiments.

The paired cooperating metal retaining elements of this gasket provide the means for retaining the spigot in the bell, and the restraining of the bell and spigot joint is self-actuating upon the insertion of the spigot into the bell, as is the sealing in the optional configuration having sealing means. Further, the retaining means of the present invention allows the gasket to be used with a variety of internal bell wall configurations, and the bell internal configuration will not be totally dependent upon the design and operation of the retaining means of the gasket.

A further advantage of the present invention is that the paired cooperating retaining elements, in which a first element comprises a teeth-bearing wedge-shaped member and a second element comprises a backing member which presents a bearing surface to the wedge-shaped member allowing the wedge-shaped member to rotate about its own axis and move axially relative to the backing member, provide improved gripping of the spigot end of the pipe which is inserted in the bell end of another pipe. The wedge-shaped member may also preferably be provided with teeth which have a smaller radius of curvature than the radius of curvature of the outer spigot wall, thereby reducing the amount of contact force required to achieve a sufficient amount of "bite" or restraining force to prevent the spigot from being removed from the bell.

BRIEF DESCRIPTION OF THE DRAWINGS

These and other features of the present invention and the attendant advantages will be readily apparent to those having ordinary skill in the art and the invention will be more easily understood from the following detailed description of the preferred embodiments of the present invention taken in conjunction with the accompanying drawings wherein like reference characters represent like parts through the several views.

DETAILED DESCRIPTION OF THE INVENTION

Figure 1:
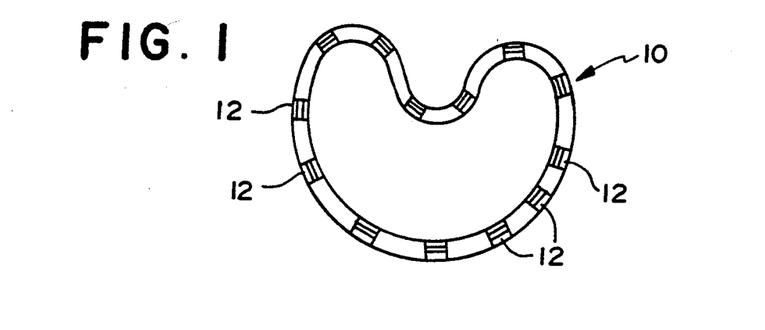
FIG. 1 is an elevation view of the gasket in its elastically deformed shape for insertion into the bell or socket part of the joint.

Referring initially to FIG. 1, an elastomeric gasket 10 according to a preferred embodiment of the present invention is depicted. A plurality of pipe spigot retaining means 12 are embedded in the gasket 10, and are spaced around the circumference of the gasket. The elastomeric gasket, which is an annular ring in its normal configuration, is preferably elastically deformable into a shape such as that depicted in FIG. 1 in order to allow easy insertion of the gasket into a bell end of a pipe having an opening which is of a smaller diameter than the outer diameter of the gasket. This general type of gasket is known in the art for use in bell and spigot joints, and the improvements provided by the present invention will be discussed in further detail in connection with FIGS. 2-5.

Figure 2:
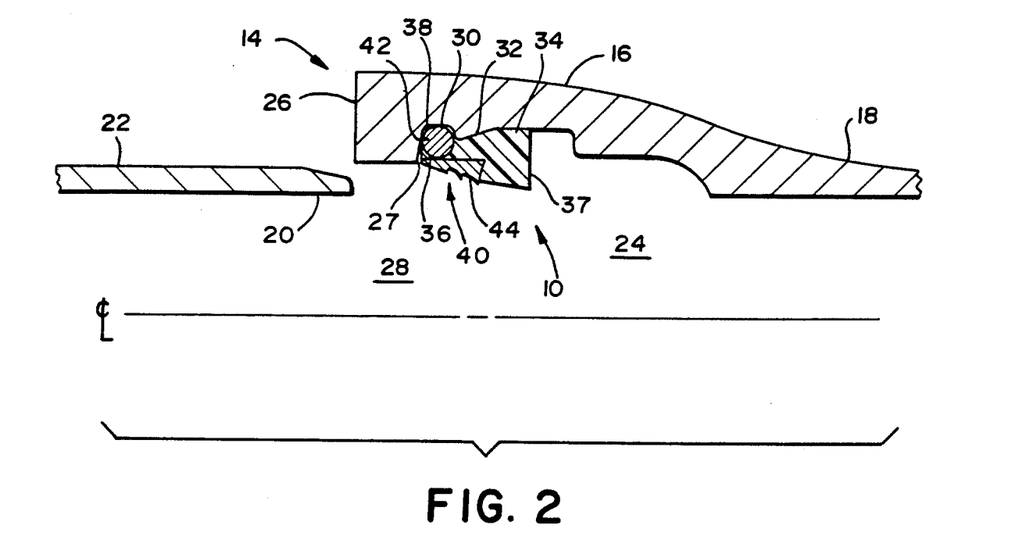
FIG. 2 is a partial cross-sectional view of the bell and spigot joint of the present invention prior to joint assembly.
Figure 3:
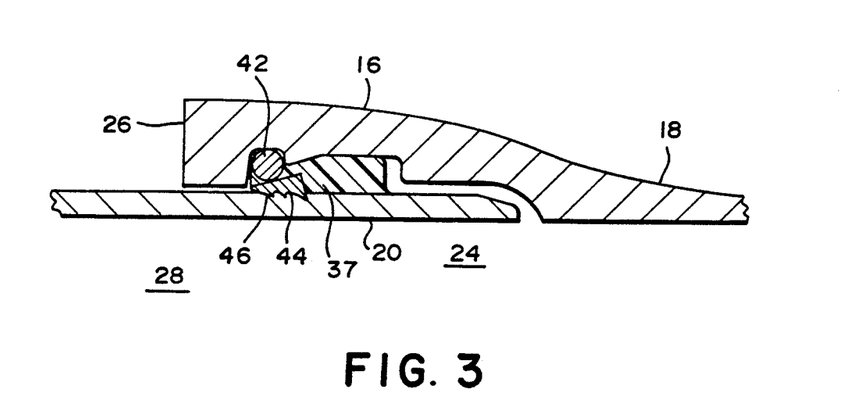
FIG. 3 is a partial cross-sectional view of the bell and spigot pipe joint after assembly.

FIGS. 2 and 3 depict a pipe joint 14 of the field adaptable bell-and-spigot type which is suitable for use with the gasket 10 of the present invention in forming a "push-on" type self-actuating restrained joint. FIG. 2 depicts a pipe bell 16 disposed at one end of a first pipe 18, and a spigot end 20 of a second pipe 22, prior to the insertion of the spigot 20 into the bell 16 in forming the joint. This type of joint is considered to be field adaptable in that the spigot end 20 of each pipe may be cut to length as necessary in constructing a piping run or pipeline. It is to be noted that, while the present specification discusses a joint between two sections of pipe, that the invention is not intended to be so limited. Piping appurtenances such as valves, fittings, hydrants, and even non-piping elements may be employed as one or both of the elements to be joined, and the terms "pipe" and "piping element" as used herein will refer to these elements as well.

Figure 4A:
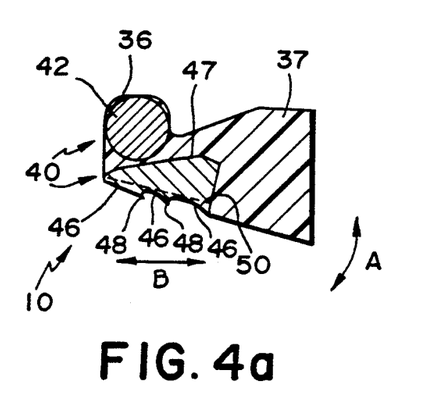
FIG. 4a is a cross-sectional view of a preferred embodiment of the gasket of the present invention.
Figure 4B:
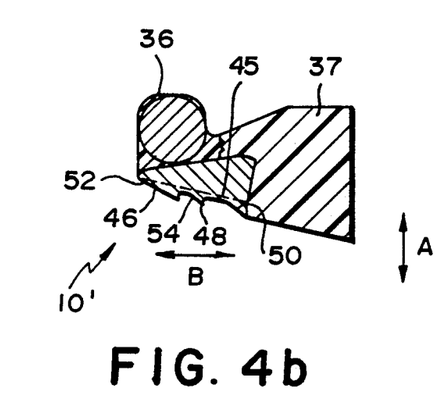
FIG. 4b is a cross-sectional view of a further preferred embodiment of the gasket of the present invention.

As seen in FIGS. 2 and 3, the gasket 10 will elastically return to its annular form in the interior 24 of the pipe bell 16 after having been inserted axially past shoulder 26 defining the opening 28 at the bell end of pipe 18. In this preferred embodiment, an annular gasket recess 30 is provided in the bell end of pipe 18, which is bounded axially by an inner surface 27 of shoulder 26 and an annular tapered protrusion 32 spaced apart axially from shoulder 26. As best seen in FIGS. 2 and 4, the shape of the external peripheral surface 34 of the gasket 10 preferably has substantially the same shape as the interior contour of the bell 16 in the portion of the bell adapted to receive the gasket therein, although this is not specifically required. A front end 36 of the gasket is shaped to abut against the inner surface 27 of shoulder 26 and to rest radially against the annular wall 38 of recess 30. A back end 37 of the gasket 10 tapers radially outwardly over a portion of its length, and then takes on a substantially constant outer radius to conform to the interior contour of the bell 16, when the bell is shaped as shown in FIG. 2. In this preferred embodiment, the back end of the gasket is adapted to serve as a sealing means for the joint, however, as will be discussed later in further detail, the gasket need not be provided with sealing means if sealing of the joint is not required or if sealing is effected by separate sealing means.

In the depicted preferred embodiment, the pipe spigot restraining means 12 of the present invention comprises a plurality of paired cooperating retaining elements 40 disposed around the circumference of the gasket, as best shown in FIG. 1. Each of the plurality of paired cooperating retaining elements 40 preferably comprises a cylindrically shaped (circular in cross-section) backing member 42 and a teeth-bearing wedge member 44. The wedge member 44 has a radial inner surface 45 on which a plurality of teeth 46 are formed, and a radial outer surface 47 which diverges away from the radial inner surface over at least a portion thereof in a direction running from the front end (nearest pipebell opening 28) to the back end of the gasket. The paired cooperating retaining elements 40 are set in the elastomer gasket 10 in a vulcanizing process or in an alternate process which will allow the elements 40 to become captively retained by the elastomer.

It has been discovered, in accordance with the development of the gasket and joint of the present invention, that the gasket 10 (FIG. 4a) may preferably be made of a single durometer material which is soft and compressible, as it has been determined that the backing members 42 disposed around the circumference of the gasket 10 will effectively anchor the gasket in place in the recess in a pipe bell and will effectively resist damage and dislodgement from the gasket recess. Significant and substantial advantages are realized in using a gasket of only a single durometer hardness as compared with dual durometer gaskets previously employed in the art, in that the cost of manufacture of the gaskets is substantially reduced and any potential problems with the integrity of the bonding of a hard elastomer to a softer elastomer are avoided. The use of a soft, compressible material allows the required fluid seal to be created when the spigot 20 is inserted into the bell end in creating the joint.

The gasket 10' in an alternative preferred embodiment may be of the "dual durometer" type (FIG. 4b) previously used in the art in push-on restrained joints, wherein the front end 36 of the gasket is formed of a hard, relatively incompressible elastomeric material, and the back end 37 of the gasket is made of a softer, lower durometer (hardness) material which is more easily compressed. The hard, relatively incompressible material of the front end 36 has heretofore been required in order to ensure that the gasket does not become damaged and/or dislodged from the gasket recess in the pipe bell, particularly when a spigot end of another pipe is inserted. The hard front end 36 is adhesively joined, or is joined in a vulcanization process, to the softer back end 37 of the elastomeric gasket 10'.

In this embodiment, the backing members 42 of the paired cooperating retaining elements 40 are embedded in the hard front end 36 of the elastomeric gasket 10'. The wedge member 44 may be embedded in the softer elastomeric material, in the hard elastomeric material, or partially in each material, and is capable of radial movement as at A and axial movement as at B, restrained substantially only by the backing member 42 and somewhat by the surrounding elastomer. The softer back end 37 of the elastomeric gasket 10' like gasket 10 of FIG. 4a, is compressible and creates a fluid seal when the spigot 20 is inserted into the bell 16, as best shown in FIG. 3.

In constructing a joint 14 using the gasket 10 according to a preferred embodiment of the present invention, the spigot 20 of pipe 22 is inserted into the bell 16, where it first contacts the wedging members 44 of the paired cooperating inserts 40. Each of the wedging members 44 is disposed in the gasket in a manner such that the plurality of serrated teeth 46 are exposed (not covered by the elastomer) and are presented to a spigot end of the pipe being inserted. There is a tendency, as the spigot 20 is inserted further into the bell 16, for the gasket 10 to move axially rearwardly into the interior of the bell or sealing chamber 24. However, the embedded backing member 42 of the paired cooperating retaining members 40 coacts with the annular recess 30 and the tapered protrusion 32 adjacent the recess 30 so as to prevent the gasket 10 from being dislodged rearwardly out of the recess. In the dual durometer embodiment of the gasket 10', the harder front end 36 of the gasket also aids in preventing dislodgement of the gasket.

Each wedging member 44 of the paired cooperating retaining elements 40 is permitted to move relatively freely with respect to its associated backing member. The backing member presents a bearing surface to the radial outer surface 47 of the wedging member, which selectively restricts movement to assist in wedging of the member between the backing member and the pipe spigot. As the spigot is inserted, the edges 48 of one or more of the teeth 46 of each wedging member 44 come into contact with the spigot 20 of pipe 22, which generally causes the wedging members 44 to move inwardly into the bell in an axial direction and radially outwardly with some rotational movement possibly also taking place. As the spigot is inserted, the outer surface of the spigot will slide past the teeth of the wedging members. The spigot forces the wedging members to move radially outwardly, placing the elements in a wedging position. Additionally, as the spigot 20 of pipe 22 is inserted axially further into the bell or socket 16, the spigot causes the soft back end 37 of gasket 10 to compress radially and to expand axially rearwardly in the sealing chamber 24. This creates a fluid seal which will prevent any material transfer between the pipe and the external environment.

In one possible joint configuration, shown in FIG. 2, the shape of the gasket 10 and the positioning of wedging member 44 in the gasket is such that the plurality of serrated teeth 46 on each wedging member are presented to the spigot at different radial spacings, in order to compensate for possible variations in the pipe spigot 20 diameter within the tolerance limits of the size of pipe to be employed. The rearwardmost teeth 50 on the wedging members 44 collectively define an opening having a diameter slightly smaller than a pipe having the smallest possible diameter which could be employed in the joint. This ensures that at least one tooth on each wedging member 44 will engage the spigot 20 of the pipe inserted into the bell 16 of pipe 18.

Further, the forwardmost teeth 52 on the wedging members 44 may collectively define an opening having a diameter slightly smaller than a diameter of a pipe having the largest possible diameter which is capable of being employed in the joint. One or more intermediate teeth 54 may be provided on each wedging member 44, which serve to improve the gripping force of the wedging element on the inserted spigot 20 of the pipe. With the additional teeth, the number of contact surfaces on the spigot is increased, giving the wedging members the ability to create a larger footprint on the outer surface of the spigot. The larger contact surface reduces contact stresses and other stresses on the spigot at the wedge locations. It is, however, only essential that the paired cooperating retaining elements are disposed to provide a wedging action to drive the teeth into the spigot when the joint is subjected to an axial thrust.

As can best be seen in FIG. 3, once the spigot 20 has been fully inserted in the bell 16 in forming the joint, one or more of the serrated teeth 46 of each wedging member 44 remain in contact with the spigot 20 of pipe 22. The spigot 20 is restrained from separating from bell 16 when forces are experienced tending to separate pipes 18, 22 by the reaction to such forces of the plurality of paired cooperating retaining elements. As the pipe 22 is pulled away from pipe 18, the teeth 46 on each wedging member 44 begin to bite into or grip the spigot 20, and the wedging member is urged forward toward the opening 28 in pipe 18. As this occurs, the wedging element is firmly wedged between the spigot 20 and the backing member 42, which in turn is restrained from radial outward movement by the annular wall 38 of the gasket recess 30. The backing member 42 may also move slightly forward until it contacts the inner surface 27 of shoulder 26. The wedging member 44 will be forced radially inwardly by the bearing surface presented by the backing member 42, increasing the bite of the teeth 46 into the spigot 20, and ultimately the wedging member will be restrained from any further forward movement, being firmly wedged between the backing member 42 and spigot 20, thus axially restraining the pipe 22, due to the gripping forces applied to the pipe spigot 20 by teeth 46. This reaction of the paired cooperating retaining elements 40 to forces tending to cause axial joint separation is termed "self-actuating" restraint.

Figure 5:
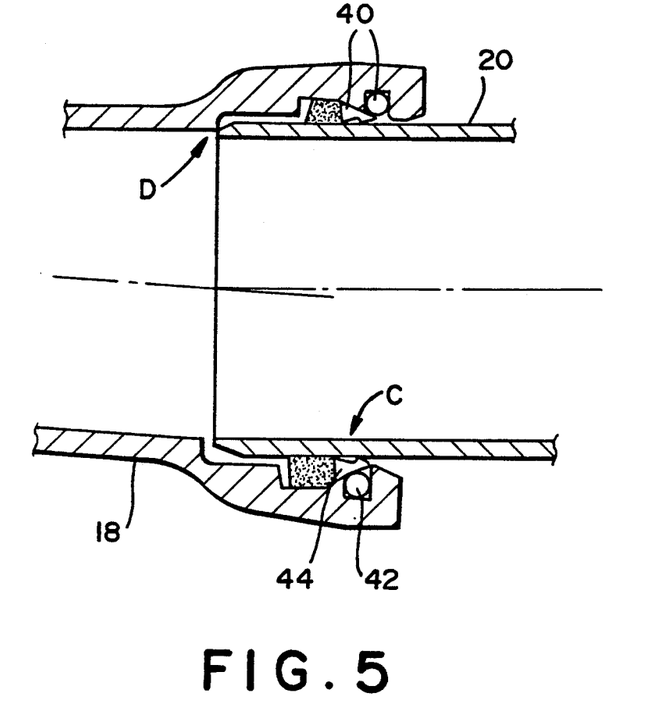
FIG. 5 is a cross-sectional view of a joint in accordance with the present invention exhibiting the restraint against over-deflection of the joint.

As seen in FIG. 5, the paired cooperating retaining elements 40 also act in a "self-actuating" mode to help prevent over-deflection (relative movement between the two sections of pipe other than axial movement) in that the backing members 42 and the wedging members 44 provide a radial support or backstop on one side of the spigot (arrow C) which works in conjunction with the contacting of the spigot end of the pipe at the back of the socket (arrow D) to aid in preventing the spigot from deflecting more than a predetermined amount.

It will be recognized that, because the teeth 46 of the wedging member 44 are required to bite into the pipe spigot 20, the teeth will be made of a material which has a much greater hardness than the pipe material. For example, when the pipes to be joined are made of ductile iron, a hardened stainless steel may preferably be employed for the wedging member 44 as well as for the backing member 42.

It should also be noted that while the depicted preferred embodiments show the teeth protruding radially inwardly from the elastomeric ring prior to joint assembly, the wedging members may optionally be set in the elastomer such that the teeth are flush with the inner radial surface of the elastomer, or even recessed with respect to the inner radial surface of the elastomer. The teeth in these alternative embodiments will still be presented to the spigot upon insertion of the spigot into the pipe bell, and will be adapted to engage the outer surface of the spigot, as the elastomer will be deformed and compressed to allow the teeth to come into contact with the spigot. In fact, the elastomer may actually cover all but the outer chordal extremities 58 of the teeth, and the gasket will still operate to provide "self actuating" restraint, as the exposed outer chordal extremities will bite into the spigot. The outer chordal extremities of the teeth may thus alternately be referred to as the gripping portion of the teeth.

While the paired cooperating elements will assist in preventing over-deflection at the joint, the gasket does allow for a substantial amount of deflection to be deliberately obtained where desired, without special assembly procedures. In normal push-on joint assembly procedures, as are used with the gasket of the present invention, the spigot is fully "homed" or inserted into contact with the back of the socket or bell, and any desired amount of deflection is then set. However, the self-actuating restraining joints disclosed in the prior art, such as that shown in U.S. Pat. No. 3,963,298, appear to require special, more precise assembly. The assembly instructions for joints using the gasket design of the '298 patent, indicate that care must be taken not to fully "home" the spigot, but instead to insert the spigot only up to a marking made on the exterior of the spigot, and then setting the desired deflection. The difference in the required assembly procedures is due to the gasket of the present invention allowing the spigot to move forward relative to the socket (joint "take up") to a limited but sufficient extent during the self-actuation of the wedging elements to permit the spigot to be deflected to the desired angle.

Figure 6:
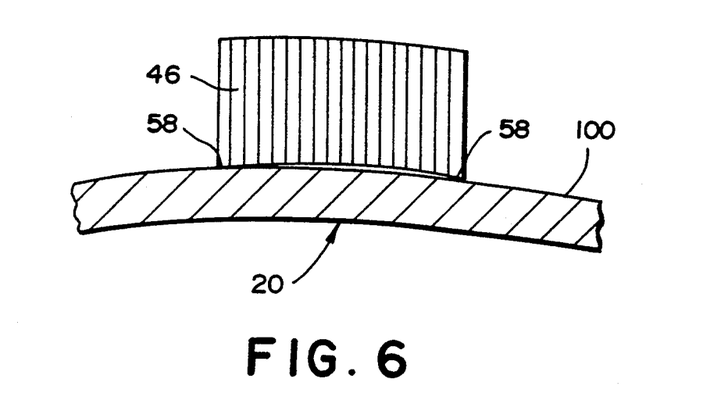
FIG. 6 is a sectional view of a preferred embodiment of the teeth-bearing wedge-shaped element in contact with a spigot when a joint is formed.

Referring now to FIG. 6, in a further improvement over the gaskets employed in push-on self-actuating restrained joints previously known in the art, the serrated teeth 46 are preferably constructed to have a radius of curvature which is smaller by a predetermined amount than the radius of curvature of the outer peripheral surface 100 of the spigot 20 to be employed in making up the joint 14. Because there are likely to be variations in the spigot diameters within predetermined tolerance limits, the radius of curvature of the teeth may be selected to be slightly smaller than the radius of curvature of a pipe spigot at the lower or smaller end of the tolerance range for the size of pipe being employed. As seen in FIG. 6, teeth 46, sized as indicated above, will engage the exterior pipe wall at the outer chordal extremities 58 of the tooth. It has been discovered in accordance with the present invention that this tooth configuration more effectively and more readily establishes a bite into an extremely smooth, hard pipe surface, than do teeth having a straight profile or teeth having a radius of curvature equal to that of the outer pipe surface, wherein the curvature of the tooth intimately conforms to the outer pipe surface. The teeth 46 having the smaller radius of curvature are capable of establishing a bite on the spigot comparable to that of other tooth configurations with less contact force than that required in those other configurations.

Figure 7:
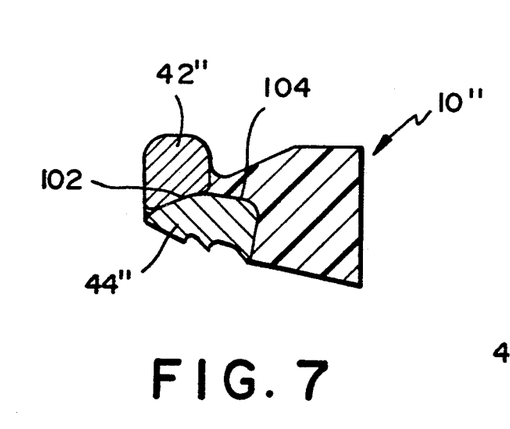
FIG. 7 is a cross-sectional view of an alternate preferred embodiment of the gasket and retaining elements of the present invention.
Figure 8:
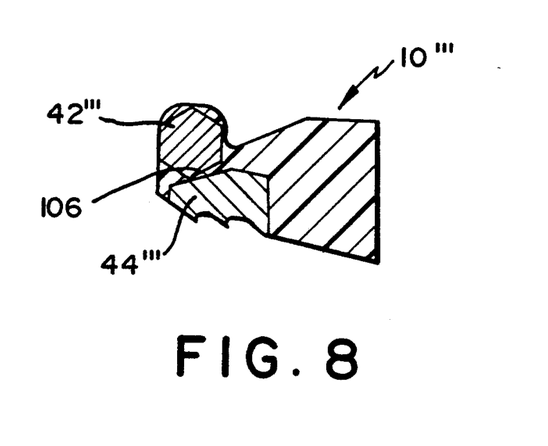
FIG. 8 is a cross-sectional view of an alternate preferred embodiment of the gasket and retaining elements of the present invention.

FIGS. 7 and 8 depict alternate preferred embodiments of the gasket of the present invention, and are shown as being merely illustrative of possible variations in the shape of the paired cooperating elements which may be embedded in the gasket of the present invention. In FIG. 7, gasket 10" has a backing member 42" which may conform more precisely to the contour of the annular recess than would the cylindrical backing element 42 as depicted in FIGS. 2-4. Backing element 42" has a bearing surface comprising a flat side 102 of the element which is disposed at an angle divergent with the spigot in the direction of the back of the pipe socket. The wedging member 44" has a radial outer curved surface 104 which diverges from the radial inner surface in the direction toward the back of the pipe socket, but does so along a predetermined radius of curvature, the curved surface 104 being adapted to contact and coact with the flat surface 102 of the backing member.

FIG. 8 depicts a gasket 10''' wherein the alternative use of a hexagonal (in cross-section) backing member 42''' is employed. One of the sides of the hexagon forms a bearing surface 106. The wedging member 44''' again has a radial outer surface 108 which diverges from the radial inner surface to impart the wedge shape of the element. The radial outer surface 108 tapers radially outwardly in a manner similar to that depicted in FIGS. 4a,b, over a portion of its length which will contact backing member 42''' in the self-actuation mode.

Again, these alternate embodiments are shown as being exemplary of the numerous shapes of paired cooperating retaining elements which may be employed in the present invention. The only essential requirement of these paired elements is that the wedging member will, in fact, operate effectively in a wedging manner against the bearing surface of the backing member when an axial thrust tending to separate the ends of the joined pipe sections is experienced. Also, while the embodiments depicted in FIGS. 7 and 8 are shown as being of a dual durometer type gasket, the gaskets may also be of the single durometer type discussed previously.

Figure 9:
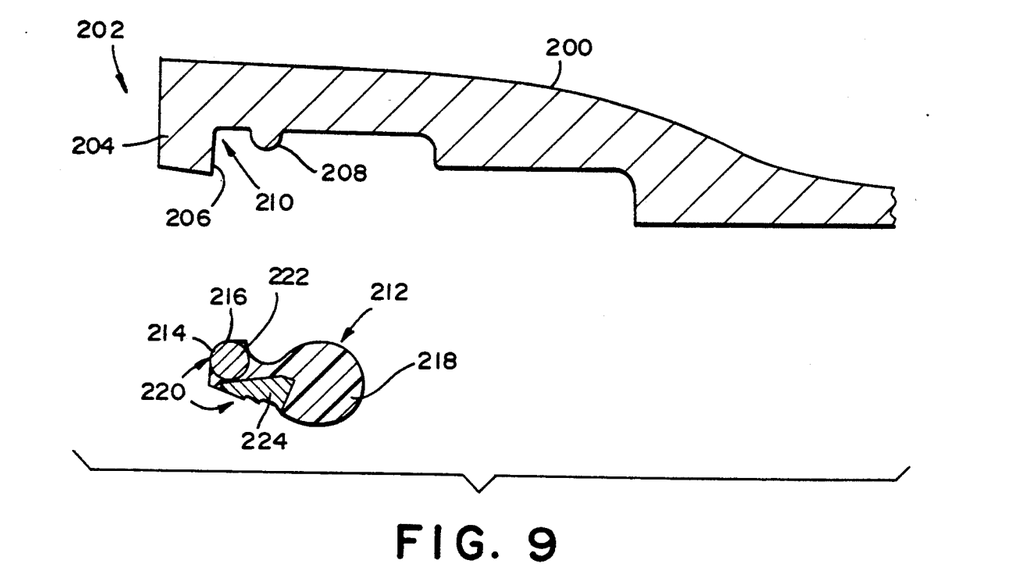
FIG. 9 is a partial cross-sectional view of an alternate socket and gasket configuration in accordance with the present invention.
Figure 10:
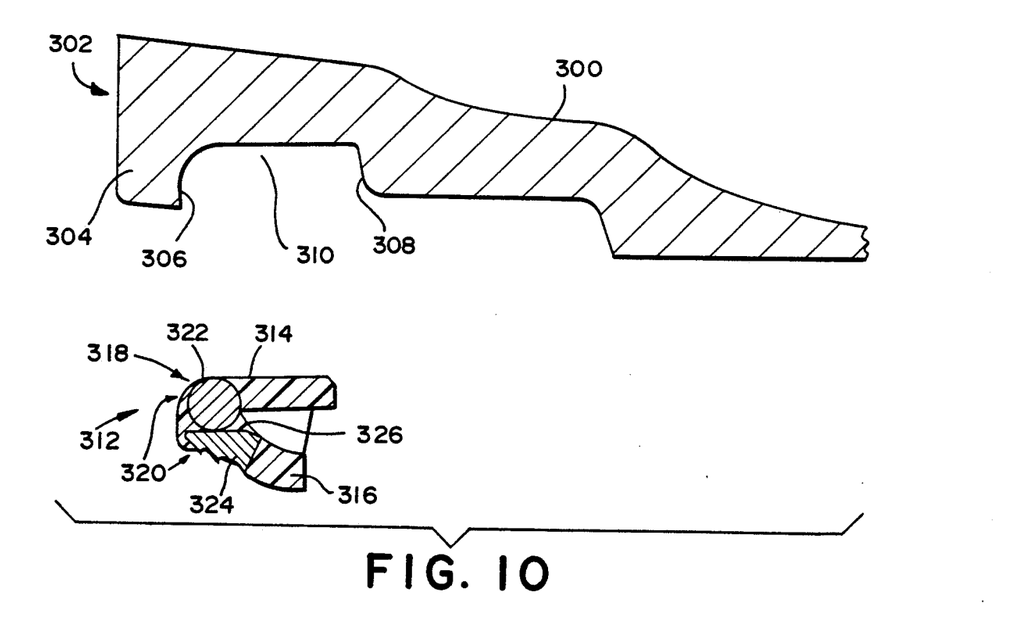
FIG. 10 is a partial cross-sectional view of an alternate socket and gasket configuration in accordance with the present invention.

FIGS. 9 and 10 are illustrative of different socket configurations with which the gasket of the present invention may be employed. These socket configurations are commonly used in the water industry, and as can be seen, the gaskets may be appropriately configured in cross-sectional shape to operate effectively with the particular socket configurations. Examples of the basic socket and gasket constructions depicted in FIGS. 9 and 10 may be found in U.S. Pat. No. 2,953,398, issued to Haugen et al and No. 3,390,890 issued to Kurtz, respectively. The subject matter of these patents is hereby incorporated by reference.

Turning first to FIG. 9, the socket 200 of the pipe (or pipe appurtenance) end 202 is provided with an outer shoulder 204, having an inner surface 206, and a rounded annular protrusion 208. The inner surface 206 of the shoulder and the annular protrusion 208 define therebetween an annular recess 210.

Gasket 212 has a front end 214 having a radial outer surface 216 shaped to be received within annular recess 210, and is preferably shaped to substantially abut against inner surface 206 of shoulder 204. The back end 218 of the gasket 212 of FIG. 9 is substantially bulb-shaped and will compress to give rise to a fluid seal upon insertion of a spigot end (not shown) of a second pipe length or pipe appurtenance.

A plurality of paired cooperating retaining elements 220 comprising backing element 222 and wedging element 224 are retained in gasket 212 in substantially the same manner as described with respect to FIGS. 2–4. It is to be noted that although the cylindrical backing element and tapered wedging element are depicted in FIG. 9, any of the various retaining element configurations depicted and described herein may be employed with this particular socket configuration and gasket.

Socket 300 disposed at the pipe end 302 depicted in FIG. 10 also is provided with an outer shoulder 304 having an inner surface 306 facing the inner portion of the socket or bell. An annular recess 310 in this embodiment is bounded at an outer axial end by surface 306 and at an inner axial end by inner shoulder or step 308. Gasket 312 has a radial outer surface 314 adapted to seat in the annular recess 310 and an inner sealing portion 316 which is disposed in the path of a spigot (not shown) to engage and seal against the outer wall of the spigot.

FIG. 10 illustrates how a plurality or paired cooperating elements 320 can be accommodated in this gasket configuration to yield a gasket according to the present invention which will self-actuate to retain a spigot end of a pipe section or pipe appurtenance within the socket or bell 300. A cylindrical backing member 322 is depicted as being disposed at the front end 318 of the gasket, with its associated wedging element 324 disposed along the inner sealing portion 316 of the gasket with its radial outer surface 326 adapted to bear against the cylindrical backing member 322. As with the socket configurations previously described in the specification, the configuration of the backing element and wedging element are not limited to those illustrated.

Figure 11:
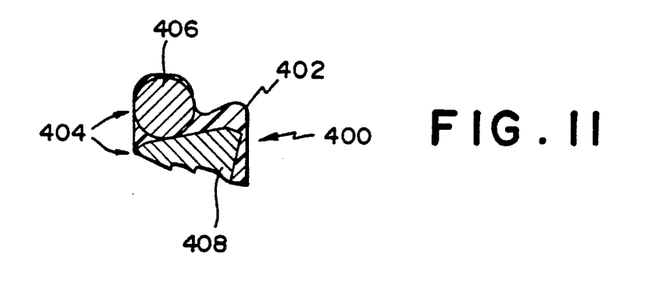
FIG. 11 is a cross-sectional view of an alternate preferred embodiment of a gasket of the present invention which would provide only a restraining function.
Figure 12:
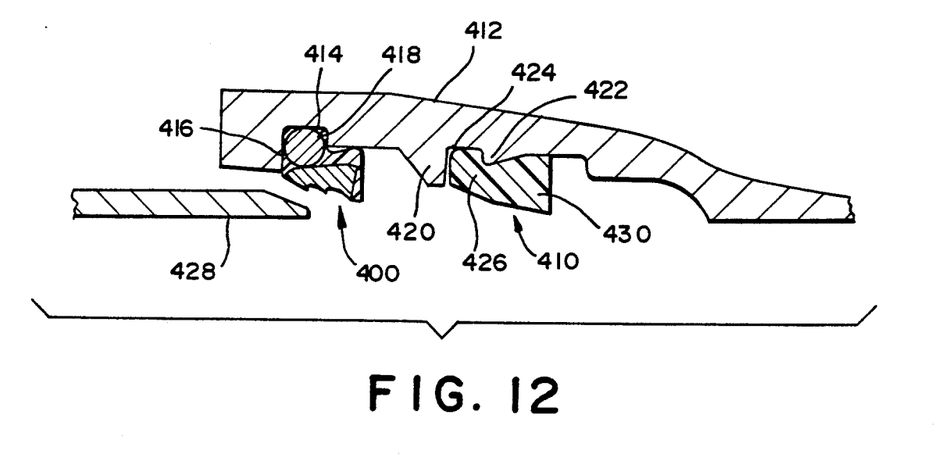
FIG. 12 is a partial cross-sectional view of an alternate preferred embodiment of the bell and spigot pipe joint, employing the gasket of FIG. 11, prior to joint assembly.
Figure 13:
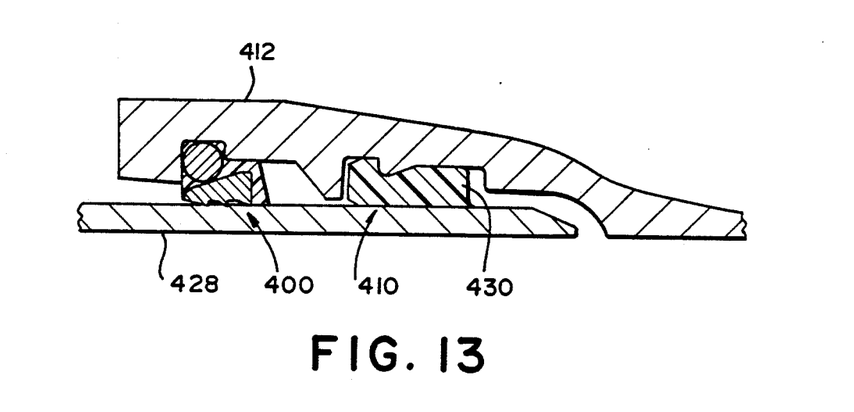
FIG. 13 is a partial cross-sectional view of the bell and spigot joint of FIG. 12 after joint assembly.

While the gasket of the present invention has been depicted and described to this point as having a sealing means formed integrally therewith, the provision for an integral sealing means is an optional feature of the self-actuating restraining gasket of the present invention. Turning now to FIGS. 11–13, a gasket 400 is depicted which contains no integral sealing means. In gasket 400, the back end 402 of the gasket terminates approximately at the back end of the wedging member 408, unlike the gaskets shown in FIGS. 4a, 4b, for example, wherein a back end of the gasket 37 extends beyond the back end of the wedging member to provide a compressible elastomeric ring adapted to form a fluid seal when compressed between the outer surface of a pipe spigot and an inner surface of a pipe bell. Gasket 400 employs a plurality of paired cooperating elements 404, each pair comprising a backing member 406 and an associated wedging member 408, as in the previously described embodiments. The paired cooperating elements work to retain a pipe spigot within pipe bell in the same manner as that described with respect to the foregoing embodiments. Gasket 400 may be made of either a hard or soft elastomer.

This gasket, having only the retaining or restraining means and no sealing means, may be employed in joints wherein no fluid seal between the members is required and could be employed in such joints in piping service or in services which may be unrelated to piping.

Gasket 400 of FIG. 11 may also be employed in joints in which a fluid seal is required, as well. FIGS. 12 and 13 depict such a joint, both prior to and after assembly, wherein a separate elastomeric ring 410 is employed as the sealing means. This elastomeric ring 410 is disposed in the pipe bell or socket 412 axially inwardly of gasket 400. The plurality of backing members 406 of gasket 400 holds the gasket in a first annular recess 414, bounded by the outer shoulder 416 of the socket 412 and a first radial protrusion 418. In this embodiment, the inner portion of socket 412 is further provided with second and third radial protrusions 420, 422, which bound a second annular recess 424, into which a front end 426 of the elastomeric sealing ring 410 is fitted to retain the sealing ring 410 at the desired axial location.

Upon insertion of spigot 428 into bell or socket 414, the gasket 400, with its plurality of wedging elements 408, moves radially outwardly to permit spigot 428 to slide axially inwardly past gasket 400. The spigot, upon reaching elastomeric sealing ring 410, also causes a sealing portion 430 of the ring to be compressed to form a fluid seal between the spigot 428 and bell or socket 414. The joint is thus self-actuating and self-sealing, employing two separate elements, namely gasket 400 and elastomeric sealing ring 410, to provide those two functions. While such an arrangement will generally require a rare complex internal bell configuration, there may be specific instances where any additional cost involved in providing the more complex bell will be justified.

While the gasket and push-on joint employing the gasket of the present invention have been described and illustrated in accordance with particular preferred embodiments, various modifications and structural changes may become readily apparent to those skilled in the art, without departing from the spirit and scope of the present invention. Accordingly, the scope of the present invention is to be determined by reference to the appended claims.

We claim:

1. A gasket for use in retaining a spigot disposed at one end of a piping element within a bell disposed at one end of another piping element, comprising:
   an annular ring of elastomeric material adapted to seat in an annular recess in an interior of said bell wherein a front end of said ring is adapted to be disposed nearest an opening at the end of the bell;
   a plurality of paired mutually cooperating retaining elements, each pair of retaining elements being spaced apart from other pairs around a circumference of said elastomeric ring, said pairs of retaining elements being captively retained by said elastomeric ring;
   each of said plurality of paired cooperating elements comprising a backing member disposed at said front end of said annular ring and adjacent a radial outer surface of said front end, and an associated wedge member disposed radially inwardly of said backing member, said wedge member having at least one serrated tooth disposed on a radial inner surface thereof, and said wedge member having a radial outer surface, at least a portion of which diverges from said radial inner surface in a direction from the front end of said annular ring to a back end of said annular ring, wherein the wedge member is movable relative to said backing member, and wherein said backing member presents a bearing surface to said radial outer surface of said wedge member and
   wherein, when said annular ring is positioned in the bell, said at least one tooth on each of said wedge members is positioned to engage an outer surface of a spigot of a piping element to be inserted into said bell.

2. A gasket as defined in claim 1 further comprising integral sealing means for effecting a fluid seal between said bell and said spigot when said spigot is inserted in said bell, said sealing means being disposed at said back end of said gasket.

3. A gasket as defined in claim 2 wherein said back end of said annular ring comprising said sealing means is made of a soft, compressible elastomeric material.

4. A gasket as defined in claim 3 wherein said front end of said gasket is made of the same elastomeric material as said back end, and is of the same hardness as said back end.

5. A gasket as defined in claim 4 wherein a lower gripping edge of each of said plurality of teeth has a radius of curvature which is smaller than a radius of curvature of an external surface of a spigot of a piping element to be inserted in said bell.

6. A gasket as defined in claim 3 wherein said front end of said gasket is made of a harder elastomeric material than said back end, said harder elastomeric material being relatively incompressible.

7. A gasket as defined in claim 2 wherein each of said wedge members has a plurality of serrated teeth disposed thereon.

8. A gasket as defined in claim 1 wherein said front end of said annular ring has a radial outer surface adapted to seat in an annular recess in said bell of said piping element corresponding in shape to said radial outer surface, and said back end of said annular ring comprises sealing means for effecting a fluid seal between said bell and a spigot to be inserted in said bell, said sealing means extending rearwardly from said front end and conforming substantially in shape to a shape of a corresponding portion of said interior of said bell.

9. A gasket as defined in claim 6 wherein said radial outer surface of said back end of said annular ring comprising said sealing means is tapered radially outwardly from a point adjacent to said front end over a predetermined portion of said back end, and a remainder of said back end has a substantially constant outer radius.

10. A gasket as defined in claim 9 wherein each of said backing members is substantially cylindrical in shape.

11. A gasket as defined in claim 8 wherein a lower gripping edge of each of said plurality of teeth has a radius of curvature which is smaller than a radius of curvature of an external surface of a spigot of a piping element to be inserted in said bell.

12. A gasket as defined in claim 1 wherein a lower gripping edge of each tooth has a radius of curvature which is smaller than a radius of curvature of an external surface of a spigot of a piping element to be inserted in said bell.

13. A gasket as defined in claim 1 wherein each of said backing members is substantially cylindrical in shape.

14. A gasket as defined in claim 1 wherein each of said backing members is substantially hexagonal in shape.

15. A gasket as defined in claim 1 wherein a radial outer surface of each of said backing members conforms substantially in shape to a shape of said annular recess.

16. A gasket as defined in claim 1 wherein each of said wedge member has a plurality of serrated teeth disposed thereon.

17. A piping joint comprising:
   a first piping element having a bell end, said bell end having an opening of a predetermined size and an annular recess in an interior surface thereof;
   a second piping element having a spigot end inserted and retained in said bell end of said first pipe,
   a gasket disposed in said bell end of said first piping element comprising an elastomeric annular ring, said gasket being seated in said annular recess in said interior surface of said bell end of said first piping element, a front end of said gasket being disposed nearest said opening in said bell;
   said gasket having a plurality of paired mutually cooperating retaining elements captively retained therein and spaced apart around a circumference of said annular ring, a first element of each pair comprising a backing member disposed at said front end of said gasket adjacent a radial outer surface of said front end, a second element of each pair comprising a wedging member disposed radially inwardly of said backing member, a radial outer surface of each of said wedging members being in contact with a bearing surface of an associated backing member said wedge members being tapered radially outwardly over at least a portion thereof in the direction extending axially inwardly into said first piping element from said bell opening, each of said wedging members increasing in thickness in said direction over said tapered portion, each of said wedging members having at least one tooth extending from an inner radial surface, said at least one tooth on each of said wedging members being in biting engagement with said outer surface of said spigot end of said second piping element, and wherein said plurality of paired cooperating retaining elements coact to restrain said bell end and said spigot end from separating when axial forces tending to separate said bell end and said spigot end are experienced.

18. A piping joint as defined in claim 17 wherein each of said backing members is substantially cylindrical in shape.

19. A piping joint as defined in claim 17 wherein each of said backing members is substantially hexagonal in cross-sectional shape.

20. A piping joint as defined in claim 17 wherein said annular recess is bounded at an outer axial extent by a shoulder of said bell end extending radially inwardly and defining said bell opening in said bell end.

21. A piping joint as defined in claim 20 wherein said annular recess is bounded at an inner axial extent by a protrusion extending radially inwardly from said interior surface of said bell end.

22. A piping joint as defined in claim 21 wherein a radial outer surface of said front end of said gasket conforms substantially in shape to said annular recess, and a back end of said gasket comprises sealing means for effecting a fluid seal between said bell end and said spigot end, extending axially inwardly into said bell from said protrusion.

23. A piping joint as defined in claim 22 wherein said back end of said gasket is made of a soft, compressible elastomeric material.

24. A piping joint as defined in claim 23 wherein said front end of said gasket is made of an elastomeric material having the same hardness as said back end.

25. A piping joint as defined in claim 23 wherein said front end of said gasket is made of an elastomeric material having a higher hardness than said back end, said higher hardness elastomeric material being relatively incompressible.

26. A piping joint as defined in claim 17 wherein a back end of said gasket is made of a soft, compressible elastomeric material, and said back end comprises sealing means for connecting a fluid seal between said bell end and said spigot end.

27. A piping joint as defined in claim 26 wherein said front end of said gasket is made of an elastomeric material having the same hardness as said back end.

28. A piping joint as defined in claim 26 wherein said front end of said gasket is made of an elastomeric material having a higher hardness than said back end, said higher hardness elastomeric material being relatively incompressible.

29. A piping joint as defined in claim 17 further comprising sealing means for effecting a fluid seal between said bell end and said spigot end, said sealing means comprising a second elastomeric annular ring being of a thickness whereby said second annular ring will be compressed between said bell end and said spigot end when said spigot end is inserted into said bell end.

30. A piping joint as defined in claim 29 wherein said second elastomeric annular ring is disposed axially inwardly from said gasket in said bell end.

31. A self-actuating restraining gasket adapted to retain a spigot end of a first section of a piping element within a bell end of a second section of a piping element comprising:

an annular ring of elastomeric material, said annular ring being adapted to seat in an annular recess in an interior of said bell, a front end of said ring being adapted to be disposed nearest an opening at the bell end of said second piping element, a plurality of associated pairs of retaining elements, said associated pairs of retaining elements being spaced apart around a circumference of said elastomeric ring, said associated pairs of retaining elements being captively retained in said elastomeric ring;

each of said plurality of pairs of associated elements comprising a backing member disposed in said front end of said annular ring adjacent a radial outer surface of said front end, and an associated wedge member disposed radially inwardly of said backing member, each of said wedge members having at least one tooth disposed on an inner surface thereof, at least a gripping portion of each of said at least one tooth on each wedge member being exposed to engage a spigot end of a first piping element to be inserted into a bell end of a second piping element in which said annular ring is adapted to be disposed.

32. A self-actuating restraining gasket as defined in claim 31, wherein a back end of said annular ring comprises means for sealing an annular volume between a spigot end of a first piping element and a bell end of a second piping element when said spigot end is inserted in said bell end.

33. A self-actuating restraining gasket as defined in claim 31 wherein a lower gripping edge of each of said plurality of teeth has a radius of curvature which is smaller than a radius of curvature of an external surface of a spigot end to be inserted in a bell end.

34. A self-actuating restraining gasket as defined in claim 33 wherein said teeth protrude through a radial inner surface of said annular ring.

35. A self-actuating restraining gasket as defined in claim 31 wherein said front end and said back end of said annular ring are made of a soft, compressible elastomeric material.

36. A self-actuating restraining gasket as defined in claim 35 wherein a radial outer surface of said front end of said annular ring is adapted to seat in said annular recess in said interior of said bell, and said back end of said annular ring is adapted to extend axially inwardly from said front end into said bell when said radial outer surface of said front end is seated in said annular recess.

37. A self-actuating restraining gasket as defined in claim 31 where each of said wedge members has a radial outer surface which diverges from said radial inner surface over at least a portion thereof in a direction extending from the front end of the annular ring to the back end of the annular ring, and wherein the radial outer surface of each of the plurality of wedge members is movable relative to its associated backing member, each of said backing members presenting a bearing surface to said radial outer surface of its associated wedging member.

38. A self-actuating restraining gasket as defined in claim 37, wherein each of said wedge members has a plurality of teeth disposed thereon.

39. A self-actuating restraining gasket as defined in claim 31 wherein said annular ring of elastomeric material and said plurality of pairs of retaining elements are so constructed and arranged to allow a predetermined amount of joint deflection to be set in a joint employing said gasket after a spigot end of a first piping element has been fully homed into a bell end of a second piping element, with said gasket disposed in said bell end.

* * * * *

UNITED STATES PATENT AND TRADEMARK OFFICE
CERTIFICATE OF CORRECTION

PATENT NO. : 5,067,751
DATED : November 26, 1991
INVENTOR(S) : Van T. WALWORTH, et al It is certified that error appears in the above-identified patent and that said Letters Patent is hereby corrected as shown below:

Col. 12, line 20 (Claim 9, line 1) "claim 6" should be -- claim 8 --.

Col. 13, line 59 (Claim 26, line 4) "connecting" should be -- effecting --.

Col. 14, line 46 (Claim 33, line 2) "claim 31" should be -- claim 32 --.

Col. 14, line 54 (Claim 35, line 2) "claim 31" should be -- claim 32 --.

Signed and Sealed this

Fifth Day of October, 1993

Attest:

BRUCE LEHMAN

*Attesting Officer*     *Commissioner of Patents and Trademarks*